(12) United States Patent
Pearson et al.

(10) Patent No.: US 9,655,303 B2
(45) Date of Patent: May 23, 2017

(54) METHOD FOR CONTAINING A BALE OF COMPRESSIBLE MATERIAL

(71) Applicant: Signode Industrial Group LLC, Glenview, IL (US)

(72) Inventors: Timothy B. Pearson, Antioch, IL (US); Andrew J. Nyckowski, Palatine, IL (US)

(73) Assignee: SIGNODE INDUSTRIAL GROUP LLC, Glenview, IL (US)

( * ) Notice: Subject to any disclaimer, the term of this patent is extended or adjusted under 35 U.S.C. 154(b) by 490 days.

(21) Appl. No.: 14/445,973

(22) Filed: Jul. 29, 2014

(65) Prior Publication Data

US 2015/0075118 A1 Mar. 19, 2015

Related U.S. Application Data

(60) Provisional application No. 61/878,891, filed on Sep. 17, 2013.

(51) Int. Cl.
*B65B 3/02* (2006.01)
*B65B 5/02* (2006.01)
(Continued)

(52) U.S. Cl.
CPC ............ *A01F 25/14* (2013.01); *B30B 9/3003* (2013.01); *B65B 5/045* (2013.01); *B65B 35/20* (2013.01);
(Continued)

(58) Field of Classification Search
CPC ......... B65B 63/02; B65B 43/00; B65B 43/26; B65B 41/00; B65B 63/022; B65B 1/24;
(Continued)

(56) References Cited

U.S. PATENT DOCUMENTS

| 1,846,949 A | 2/1932 | Clark |
| 2,219,970 A | 10/1940 | Wallace |

(Continued)

FOREIGN PATENT DOCUMENTS

| AU | 4851768 A | 7/1971 |
| AU | 310432 | 10/2006 |

(Continued)

OTHER PUBLICATIONS

International Preliminary Report on Patentability dated Mar. 22, 2016, in PCT/US2014/049382.

(Continued)

*Primary Examiner* — Gloria R Weeks
*Assistant Examiner* — William A Weller
(74) *Attorney, Agent, or Firm* — Levenfeld Pearlstein, LLC

(57) ABSTRACT

A method for containing a bale of compressed material without straps or wires in a bag the bale having recessed regions therein, includes receiving the bale of compressed material in a conveyor having a mobile portion and a load carriage. The bag has reinforced regions. The load carriage has multiple tines for supporting the bale of compressed material. The tines engage the bale at at least some of the recessed regions. The bale is transferred into a bagger configured to receive the bale and move the bale from an entrance to a discharge and bagging mandrel. The bale is introduced into the bag such that at least some of the reinforced regions of the bag correspond to the recessed regions of the bale. A reinforced bag for containing a bale of compressed material without straps or wires is also disclosed.

8 Claims, 13 Drawing Sheets

(51) Int. Cl.
*B65B 43/00* (2006.01)
*B65B 1/24* (2006.01)
*B65B 13/20* (2006.01)
*B65B 63/02* (2006.01)
*A01F 25/14* (2006.01)
*B30B 9/30* (2006.01)
*B65B 35/20* (2006.01)
*B65B 39/06* (2006.01)
*B65B 5/04* (2006.01)
*B65B 27/12* (2006.01)
*B65D 33/02* (2006.01)
*B65D 85/16* (2006.01)

(52) U.S. Cl.
CPC .............. *B65B 39/06* (2013.01); *B65B 43/00* (2013.01); *B65B 63/022* (2013.01); *B65B 27/125* (2013.01); *B65D 33/02* (2013.01); *B65D 85/16* (2013.01)

(58) Field of Classification Search
CPC . B65B 13/20; B65B 5/02; A01F 25/14; A01F 2015/0745; B65D 85/16
USPC ......... 53/438, 452, 459, 567, 436, 523, 526, 53/529; 206/83.5
See application file for complete search history.

(56) References Cited

U.S. PATENT DOCUMENTS

| | | | |
|---|---|---|---|
| 2,783,598 A | 3/1957 | Wolven | |
| 3,044,231 A | 7/1962 | Blais et al. | |
| 3,172,351 A | 3/1965 | Sinclair et al. | |
| 3,195,283 A * | 7/1965 | Broersma | B65B 1/16 383/102 |
| 3,968,619 A | 7/1976 | Fishburne | |
| 4,007,575 A | 2/1977 | Hartman | |
| 4,162,603 A | 7/1979 | Stromberg | |
| 4,287,823 A | 9/1981 | Thompson | |
| 4,352,263 A | 10/1982 | Andrews, Jr. | |
| 4,372,101 A * | 2/1983 | Fleissner | B65B 27/125 53/435 |
| 4,495,751 A | 1/1985 | Galbiati | |
| 4,557,958 A * | 12/1985 | Barkis | D06N 3/0038 156/244.11 |
| 4,616,472 A | 10/1986 | Owensby et al. | |
| 4,757,667 A | 7/1988 | Elsner | |
| 4,918,905 A | 4/1990 | Hoekstra | |
| 4,995,219 A | 2/1991 | Hicks | |
| 5,024,042 A | 6/1991 | Meyer | |
| 5,054,274 A | 10/1991 | Tanaka | |
| 5,058,364 A | 10/1991 | Seiden et al. | |
| 5,088,271 A | 2/1992 | Westaway | |
| 5,117,614 A | 6/1992 | Johnsen | |
| 5,181,365 A | 1/1993 | Garvey et al. | |
| 5,201,497 A * | 4/1993 | Williams | E04H 17/02 256/12.5 |
| 5,327,704 A | 7/1994 | Hoekzema et al. | |
| 5,337,539 A | 8/1994 | Barton | |
| 5,540,032 A | 7/1996 | Sosnik et al. | |
| 5,551,212 A | 9/1996 | Odenthal | |
| 5,661,948 A | 9/1997 | Odenthal | |
| 5,694,742 A | 12/1997 | Elliott et al. | |
| 5,722,217 A | 3/1998 | Cloud | |
| 5,743,374 A | 4/1998 | Monsees | |
| 5,890,426 A | 4/1999 | Gumkowski | |
| 6,093,138 A | 7/2000 | Sorenson et al. | |
| 6,170,237 B1 | 1/2001 | Wipf | |
| 6,253,817 B1 | 7/2001 | Edwards et al. | |
| 6,564,527 B1 | 5/2003 | Focke et al. | |
| 6,823,650 B2 | 11/2004 | Recchia, Jr. | |
| 6,865,862 B2 | 3/2005 | Daoust | |
| 7,013,625 B2 | 3/2006 | Curles | |
| 7,386,968 B2 | 6/2008 | Sperry et al. | |
| 7,389,723 B1 | 6/2008 | Bullington | |
| 7,421,944 B1 | 9/2008 | Flaum | |
| 7,882,947 B2 * | 2/2011 | Evans | B65D 75/5827 206/321 |
| 7,891,156 B2 | 2/2011 | Beer | |
| 7,958,699 B2 | 6/2011 | Honegger | |
| 7,987,651 B2 | 8/2011 | Beeland et al. | |
| 8,096,097 B2 | 1/2012 | Haschke | |
| 8,235,712 B1 | 8/2012 | Lewis | |
| 8,549,820 B2 * | 10/2013 | Falise | B65B 9/14 53/176 |
| 8,556,066 B2 | 10/2013 | Honegger | |
| 2002/0108355 A1 | 8/2002 | Vignoli | |
| 2004/0216431 A1 | 11/2004 | Curles | |
| 2005/0284107 A1 | 12/2005 | Concetti | |
| 2005/0284775 A1 | 12/2005 | McLaughlin | |
| 2008/0313998 A1 | 12/2008 | Ligon et al. | |
| 2009/0241487 A1 | 10/2009 | Actis | |
| 2010/0146908 A1 * | 6/2010 | Honegger | B65B 9/073 53/439 |
| 2010/0242746 A1 | 9/2010 | Taylor | |
| 2011/0036055 A1 | 2/2011 | Shibagaki | |
| 2011/0094396 A1 | 4/2011 | Borrelli et al. | |
| 2013/0097965 A1 | 4/2013 | Honegger | |
| 2013/0097966 A1 | 4/2013 | Honegger | |
| 2013/0097976 A1 | 4/2013 | Honegger | |
| 2013/0305662 A1 | 11/2013 | Nycowski | |
| 2014/0041339 A1 | 2/2014 | Borrelli | |
| 2014/0158560 A1 | 6/2014 | Nyckowski | |
| 2014/0208694 A1 * | 7/2014 | Falise | B30B 9/3003 53/438 |
| 2014/0360138 A1 | 12/2014 | Honegger | |
| 2014/0360139 A1 | 12/2014 | Honegger | |
| 2015/0075118 A1 | 3/2015 | Pearson | |

FOREIGN PATENT DOCUMENTS

| | | |
|---|---|---|
| CN | 1527778 | 9/2004 |
| CN | 2764602 Y | 3/2006 |
| CN | 1290745 C | 12/2006 |
| DE | 3009016 A1 | 9/1981 |
| DE | 202011052218 U1 | 1/2013 |
| EP | 0198992 A1 | 10/1986 |
| EP | 0928555 A1 | 7/1999 |
| FR | 2145935 A5 | 2/1973 |
| WO | 9420366 A1 | 9/1994 |
| WO | 2006115973 A1 | 11/2006 |
| WO | 2007028558 A1 | 3/2007 |
| WO | 2008040090 A1 | 4/2008 |
| WO | 2009115314 A1 | 9/2009 |
| WO | 2012099754 A2 | 7/2012 |
| WO | 2013156854 A2 | 10/2013 |

OTHER PUBLICATIONS

International Search Report for PCT/US2014/049382 dated Oct. 10, 2014.

* cited by examiner

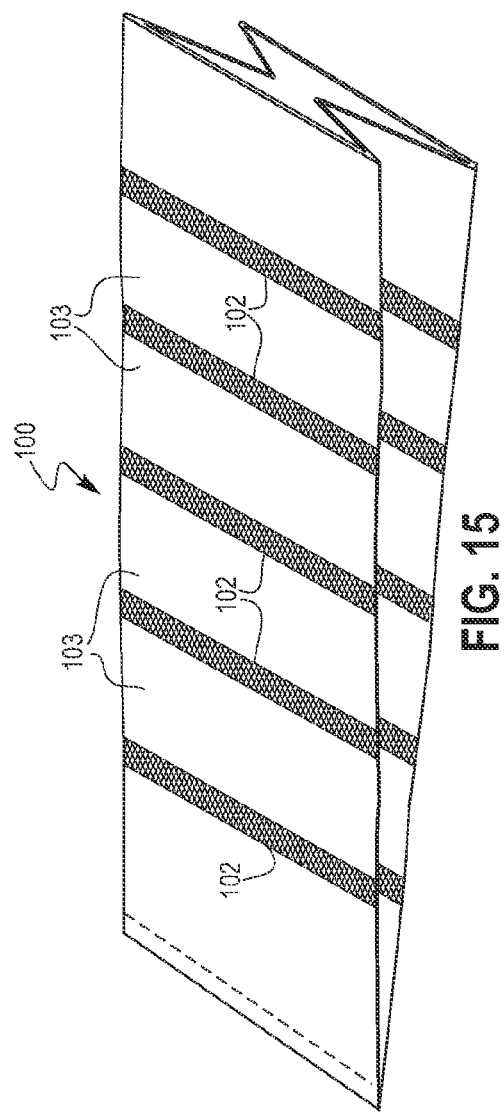
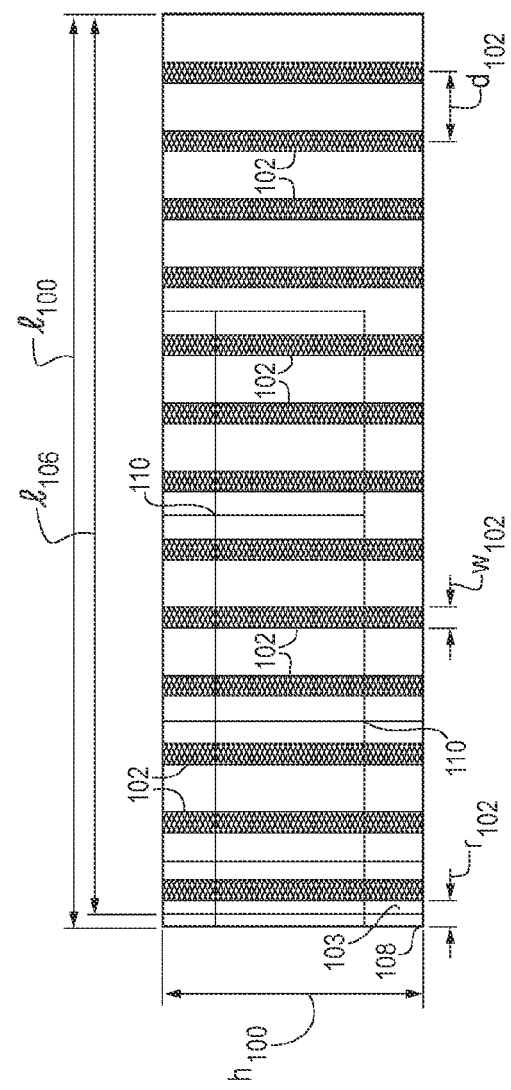
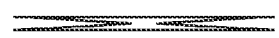
FIG. 17

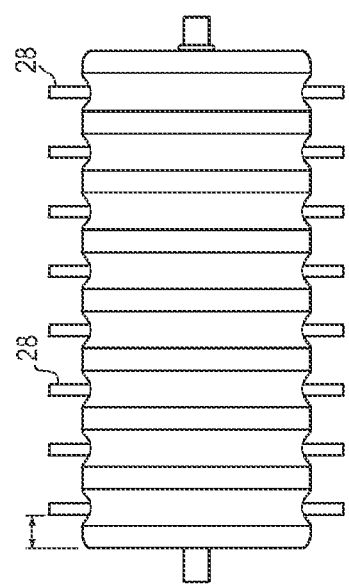
FIG. 19
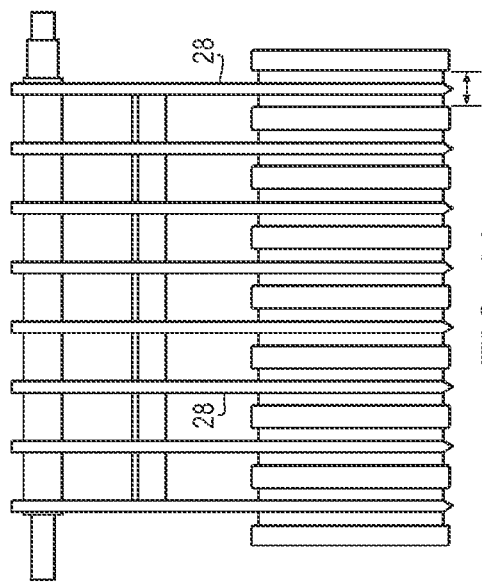
FIG. 20
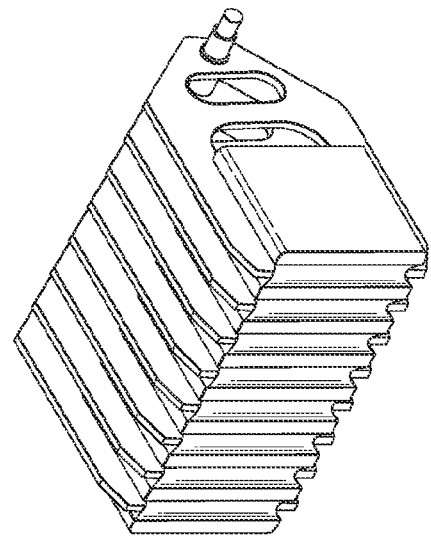
FIG. 21
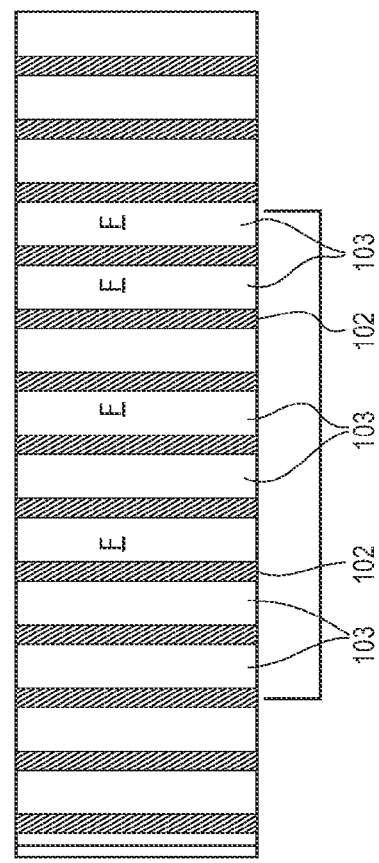

METHOD FOR CONTAINING A BALE OF COMPRESSIBLE MATERIAL

CROSS-REFERENCE TO RELATED APPLICATION DATA

This application claims the benefit of and priority to U.S. Provisional Patent Application Ser. No. 61/878,891, filed Sep. 17, 2013, the disclosure of which is incorporated herein in its entirety.

BACKGROUND

Large quantities of low density fibrous materials such as cotton and the like are often bundled or baled for handling and storage. In a typical process, cotton is cleaned to separate the cotton fibers from sticks and other debris, and the cotton fibers are separated from the seed in a gin. The cotton (referred to as lint) is transported to a press or baler where it is compressed into a high density bundle or bale. Following compaction, the compressed cotton bale is secured with multiple straps or wires to maintain the bale configuration and stability. In certain known systems, the compressed bale is transported from the press to a separate strapping machine to be secured by multiple straps or wires.

Alternately, the press can be provided or formed as part of (or integral with) the strapping machine. Such machines are disclosed in Bullington, U.S. Pat. No. 7,389,723 and Flaum, U.S. Pat. No. 7,421,944, both of which are commonly assigned with the present application and are incorporated herein by reference.

Once the bale is strapped or secured with a number of straps or wires, the bale tends to expand at the locations that are not strapped (or secured with wire). Thus, the strapped bales have recessed zones (where the straps or wires are located) in the bale. Since the straps or wires are recessed into the bale (at these recessed zones), this protects the straps from breaking, such as when the bale is being stored, transported or moved at a warehouse.

A compressed bale may also be covered with a protective overwrap, such as a bag or other suitable covering or wrapping, to protect the cotton from exposure to the environs, dirt, debris or factors that can affect the cotton quality. The wrapping or bagging may be made of polyethylene, polypropylene, cotton, or any other suitable material. Known systems for baling and wrapping cotton bales require the use of straps or wires to maintain the bale in its compacted state, as described above, and involve a separate wrapping or bagging device and downstream process to provide the protective overwrap for the bale.

While the wrapping or bagging can help to prevent damage to the bale, the wrapping or bagging material itself can be damaged. For example, at ginning facilities, cotton bales are often stored two layers high, which can put a significant amount of strain on the bales, particularly the bottom bale. Also, the cotton bales stored in certain facilities have to be rearranged or moved from time to time, such as while being loaded onto a truck for delivery. Moreover, the configuration of cotton bales being stored in a warehouse or other storage facility has to be changed from time to time in order to optimize warehouse space. During this stacking, and moving, and loading and unloading of the bales described above, the bales are frequently being pushed on an abrasive surface (e.g., concrete or asphalt flooring of a warehouse or storage facility) causing straps to break and bags or wrapping material to rupture.

Certain known systems have addressed some of the problems described above by providing strap-less systems. For example, U.S. patent application Ser. No. 13/840,601 to Nyckowski, the disclosure of which is incorporated herein in its entirety, discloses a system in which a compressed bale is conveyed to a bagging station without any straps or wire, and is introduced into a bag for handling and transport. Such a system eliminates the need for strap or wire to secure the bale, since the bale is contained by the bag. However, if the bag is damaged or is caused to rupture such as from contact with the abrasive floor of a storage facility, there is no strap or wire to help maintain the bale in a secured state.

There is therefore a need for an improved system for baling a highly compressible material, such as cotton, in a manner that can contain the pressure of the highly compressed material and that protects the bale as well as any protective wrapping or bag applied to the bale from damage.

SUMMARY

Various embodiments of the present disclosure provide a method, system, and/or device for containing a bale of compressible material without the use of straps or wires.

In an embodiment, a method according to the present disclosure includes compressing a quantity of compressible material into a bale, transferring the compressed bale to a bagging area (or to a bagger), and introducing the bale into a bag having reinforced regions or zones. As described in further detail below, the reinforced regions or zones are at designated locations on the bag, such that when the bale is introduced into and allowed to expand within the bag, the reinforced regions or zones are recessed below the face of the bag.

In an embodiment, the bale is compressed in a press having an upper plate and a lower platen, the upper plate and lower platen configured to compress the bale of compressible material therebetween. The upper plate and lower platen of the press each have a series of channels formed therein, the channels being spaced apart at designated distances from each other. The compressed bale is conveyed from the press to a bagging area or device (referred to herein as a bagger) by a conveyor. In an embodiment, the conveyor includes a mobile portion and a load carriage. The load carriage is movably mounted to the mobile portion and includes a region for receiving a bale from the press. The load carriage includes multiple tines configured to slide into (or be received by) the channels in the upper plate and lower platen of the press to facilitate removing the bale of compressible material from the press. The bale is transferred to the bagger, which includes a chute having an entrance and a discharge, which has a bagging mandrel. The entrance includes one or more guides that are configured to receive the load carriage tines for transferring the bale from the load carriage to the bagger entrance. After the bale is received in the bagger entrance, the bagger is configured to move the bale from the entrance to the discharge and the bagging mandrel, where the bale is introduced into a bag.

It should be appreciated that the bale is not contained by straps or wires when it is introduced into the bag. Rather, the bag is made of a flexible and sufficiently strong material to contain the compressed bale without the use of straps or wires. In various embodiments, the bag is a woven bag that is woven from a high strength material, such as but not limited to as polypropylene, polyethylene, polyethylene terephthalate (PET) and like materials. In an embodiment, the bag may be made by weaving or looming multiple strips or tapes of a polymeric material into a fabric that is used to make the bag.

The bag has reinforced regions or zones at designated locations on the bag. In an embodiment, the reinforced regions or zones are at designated locations which correspond to the load carriage tines. More particularly, in such an embodiment, the reinforced regions or zones are at locations that correspond to where the load carriage tines engage the bale. In other embodiments, the reinforced regions or zones may be located at designated locations which correspond to other areas of the bale that may be recessed so that the reinforced regions are recessed from the face of the bag. When the bale is introduced into the bag, those areas that are expected to expand to a greater extent are between the reinforced regions, which causes the reinforced regions or zones to be recessed below the face of the bag after the cotton has expanded into the bag. In this manner, any face or side of the bagged bale that is facing or resting on the ground (or floor) has portions that do not make contact with the ground. Therefore, even if the parts of the bag that contact the ground are damaged (such as when the bale is moved around the floor of a warehouse, or loaded and unloaded from a truck and the face of the bag is abraded), the recessed portions, which correspond to the reinforced regions of the bag, may remain intact. The reinforced portions of the bag effectively act as strapping, but are integrally formed or provided within the bag rather than being a separately applied element, as is known in the art.

These and other features and advantages of the present method, system and device will be apparent from the following detailed description, in conjunction with the appended claims.

BRIEF DESCRIPTION OF THE DRAWINGS

FIG. 15 is a perspective view of an example bag for containing a compressed bale of material in accordance with an embodiment of the system of the present disclosure, where the bag is shown in a folded state;

FIG. 16 is a front view of the example bag;

FIG. 17 is a side view of the example bag in a folded state;

FIG. 19 is a front view of the example bag which shows the relationship of the compressed bale and the grooves or recesses formed in the bale from compression (and the load carriage fork set engaging the bale) and the location of the bag reinforced regions;

FIG. 20 is a top view of the bale in the load carriage as illustrated in FIG. 19; and FIG. 21 is a perspective view of the compressed bale in the load carriage fork set.

DETAILED DESCRIPTION

Various embodiments of the present disclosure provide a method, system, and/or device for containing a bale of compressible material without the use of straps or wires.

In an embodiment, a system for containing a bale of compressible material without the use of straps or wires includes a baling machine (also referred to herein as a baler) configured to receive a bale of compressed material (e.g., from a press) and a bag having reinforced zones or regions. In an embodiment, the baler is configured to receive the compressed bale from a press and cause the compressed bale to be transferred and inserted into the bag. The bag has a plurality of reinforced zones or regions at designated locations on the bag, as described in further detail below.

Figure 1:
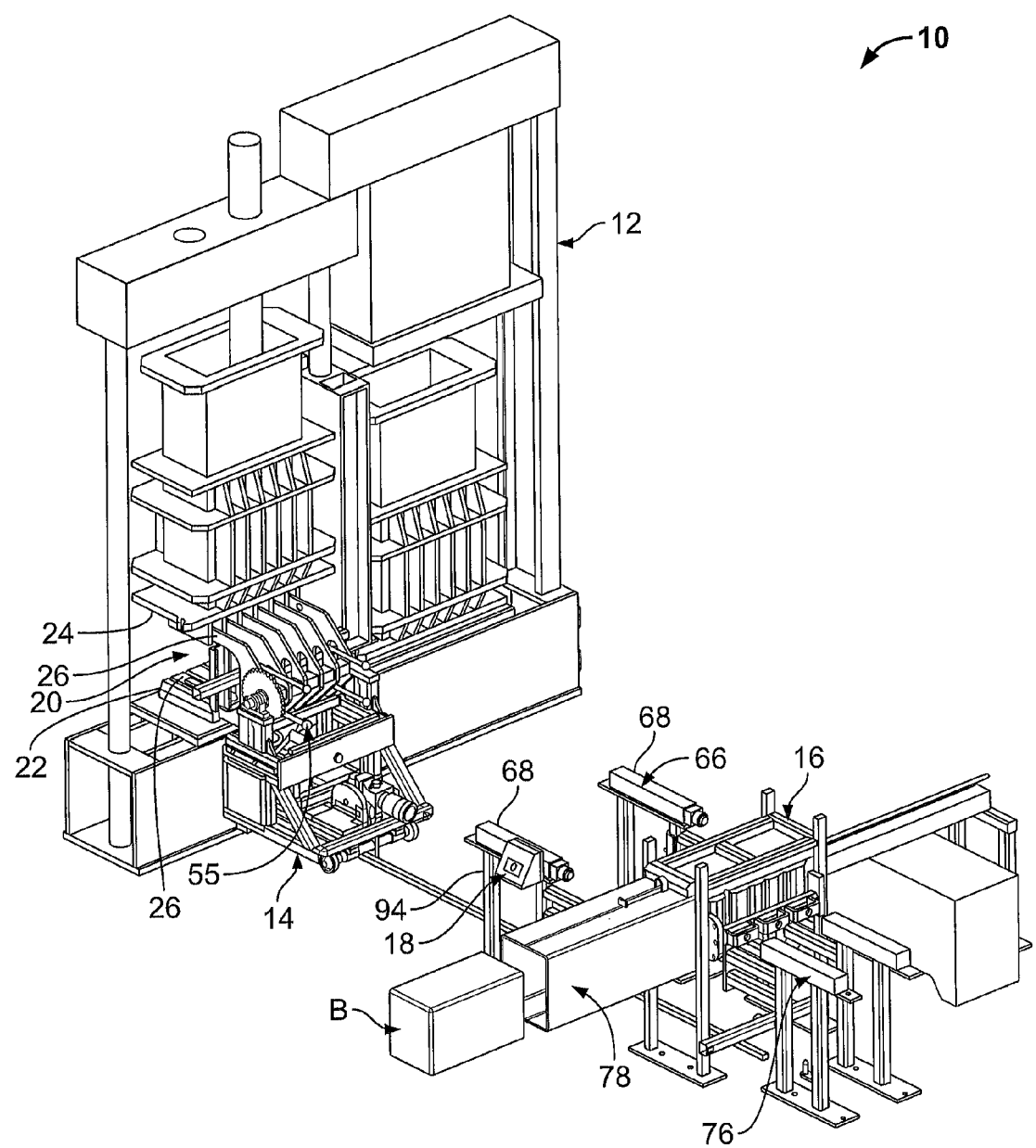
FIG. 1 is a perspective illustration of a baler including a compressible material press of an example embodiment of the system of the present disclosure.
Figure 2:
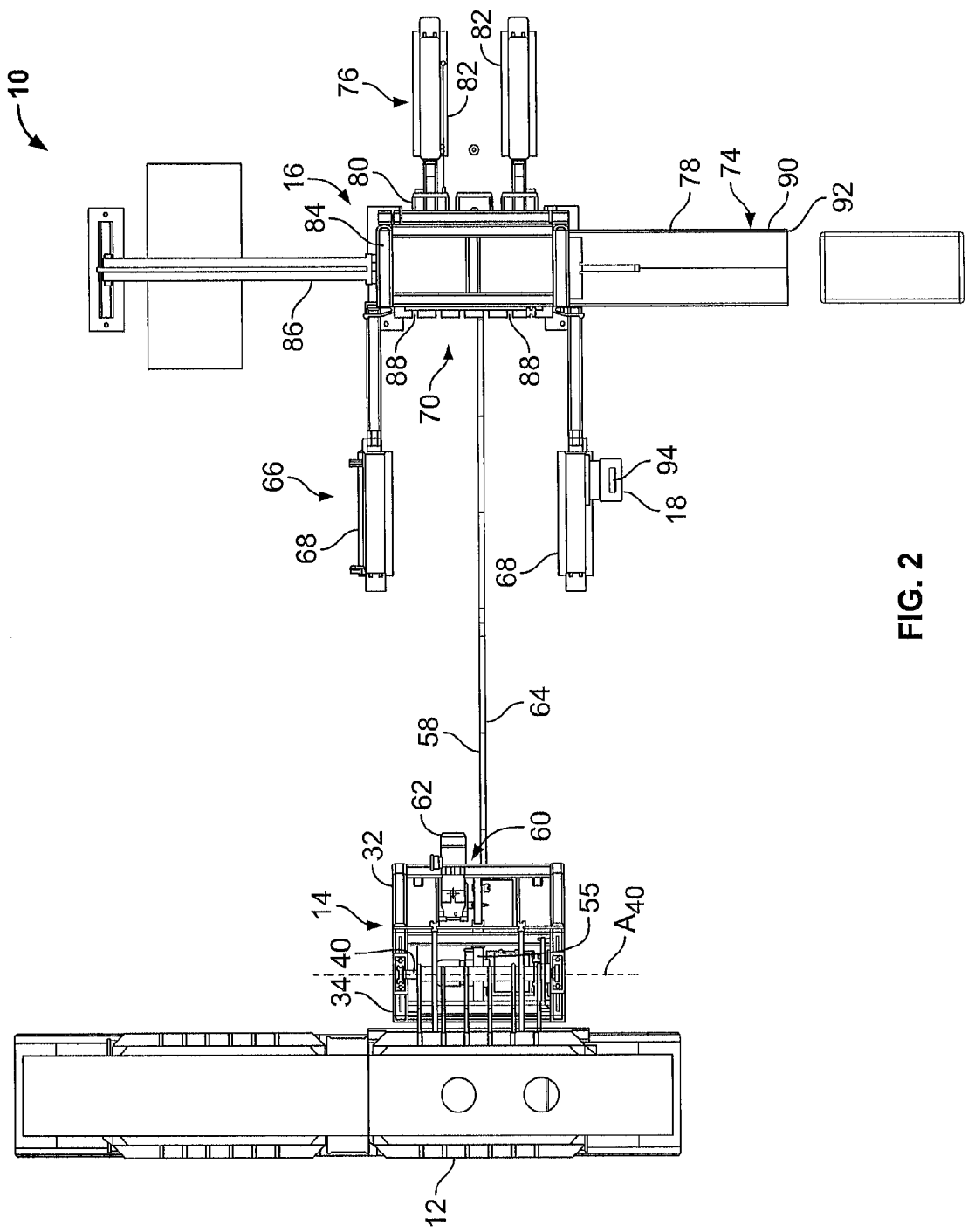
FIG. 2 is a top view of the baler and press of FIG. 1.
Figure 3:
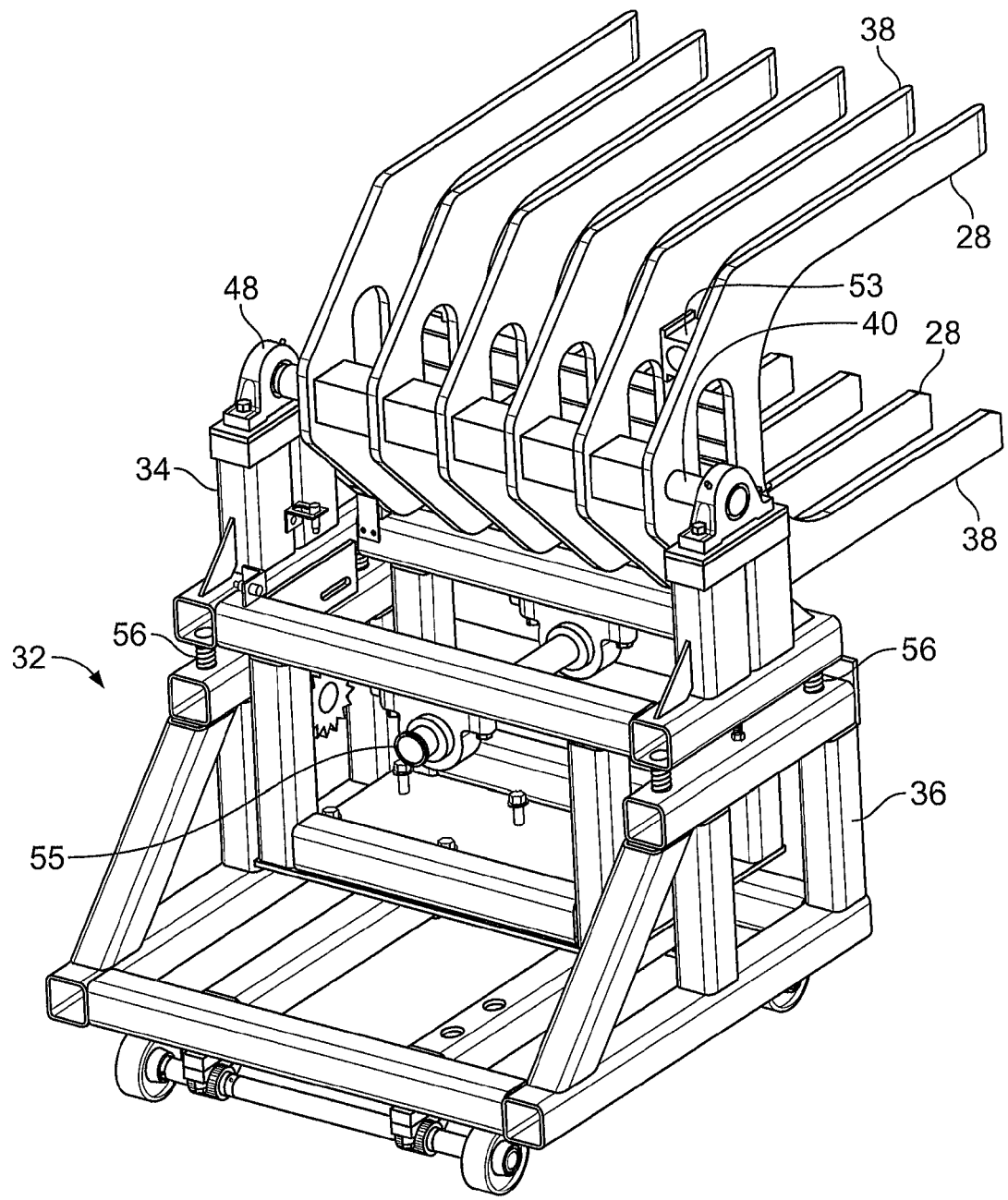
FIG. 3 is a perspective view of a conveyor load carriage and a mobile base of the illustrated example embodiment of the system of the present disclosure.
Figure 4:
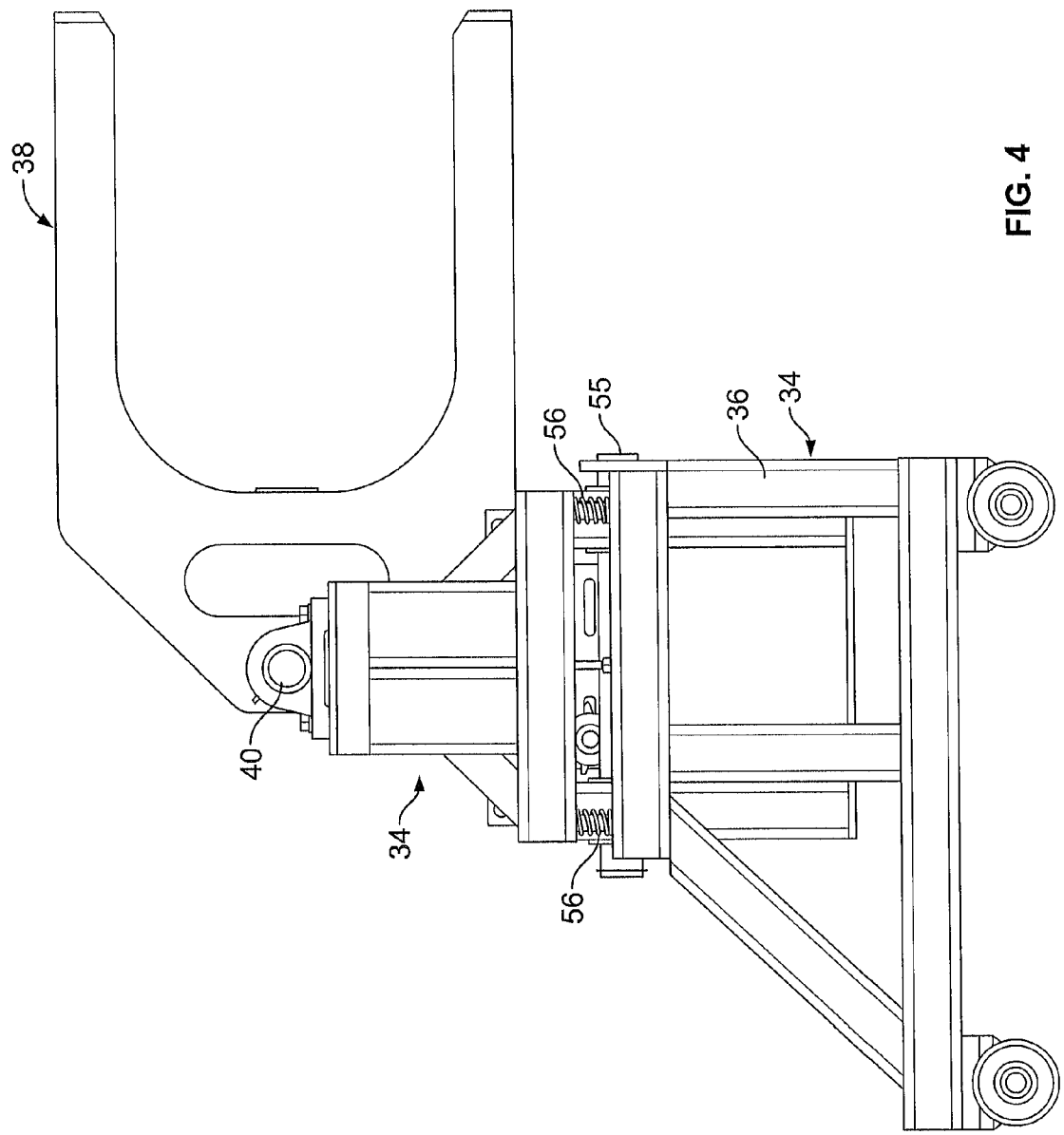
FIG. 4 is a front view of the conveyor load carriage and mobile base.
Figure 5:
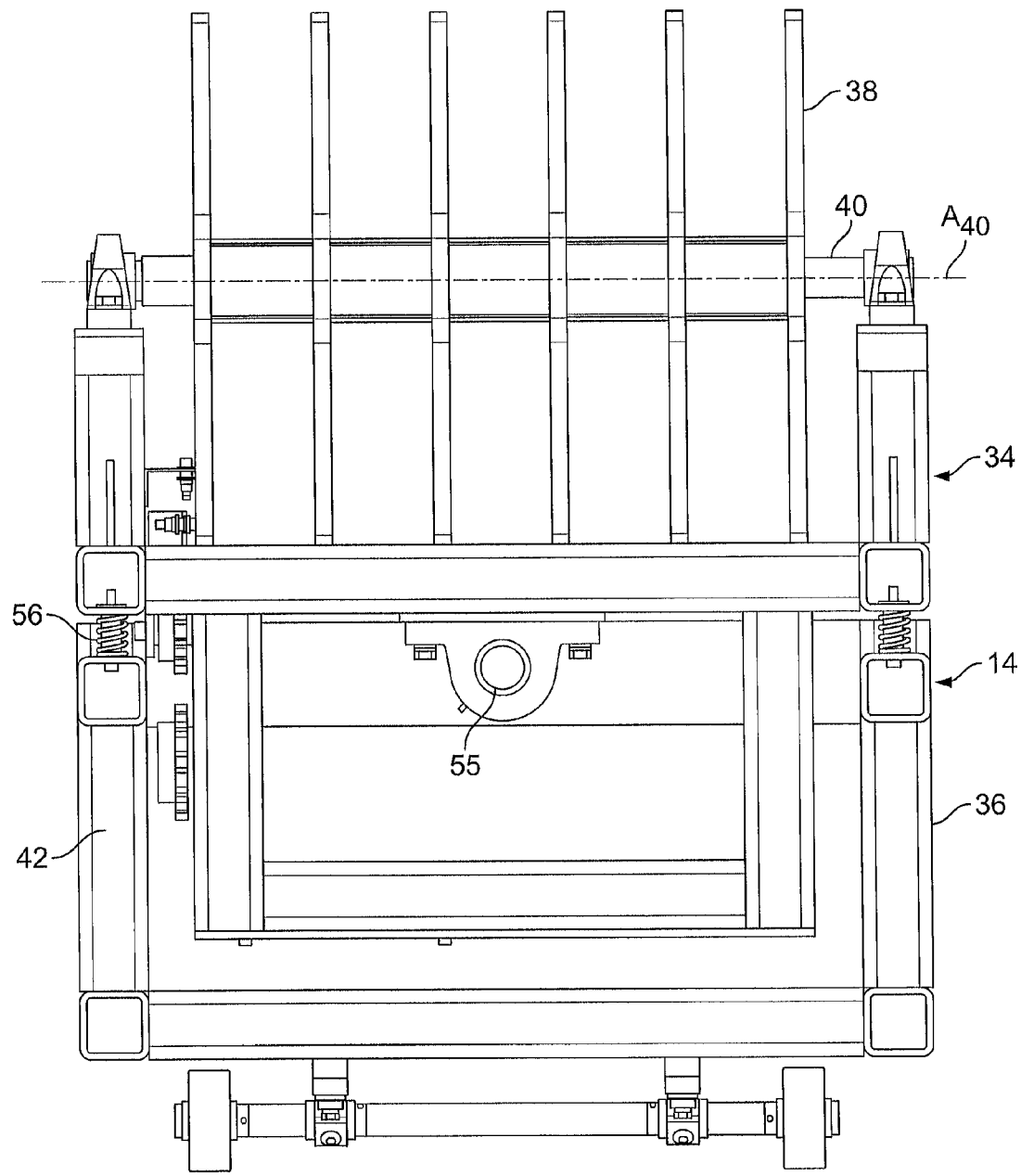
FIG. 5 is a side view of the conveyor load carriage and mobile base.
Figure 6:
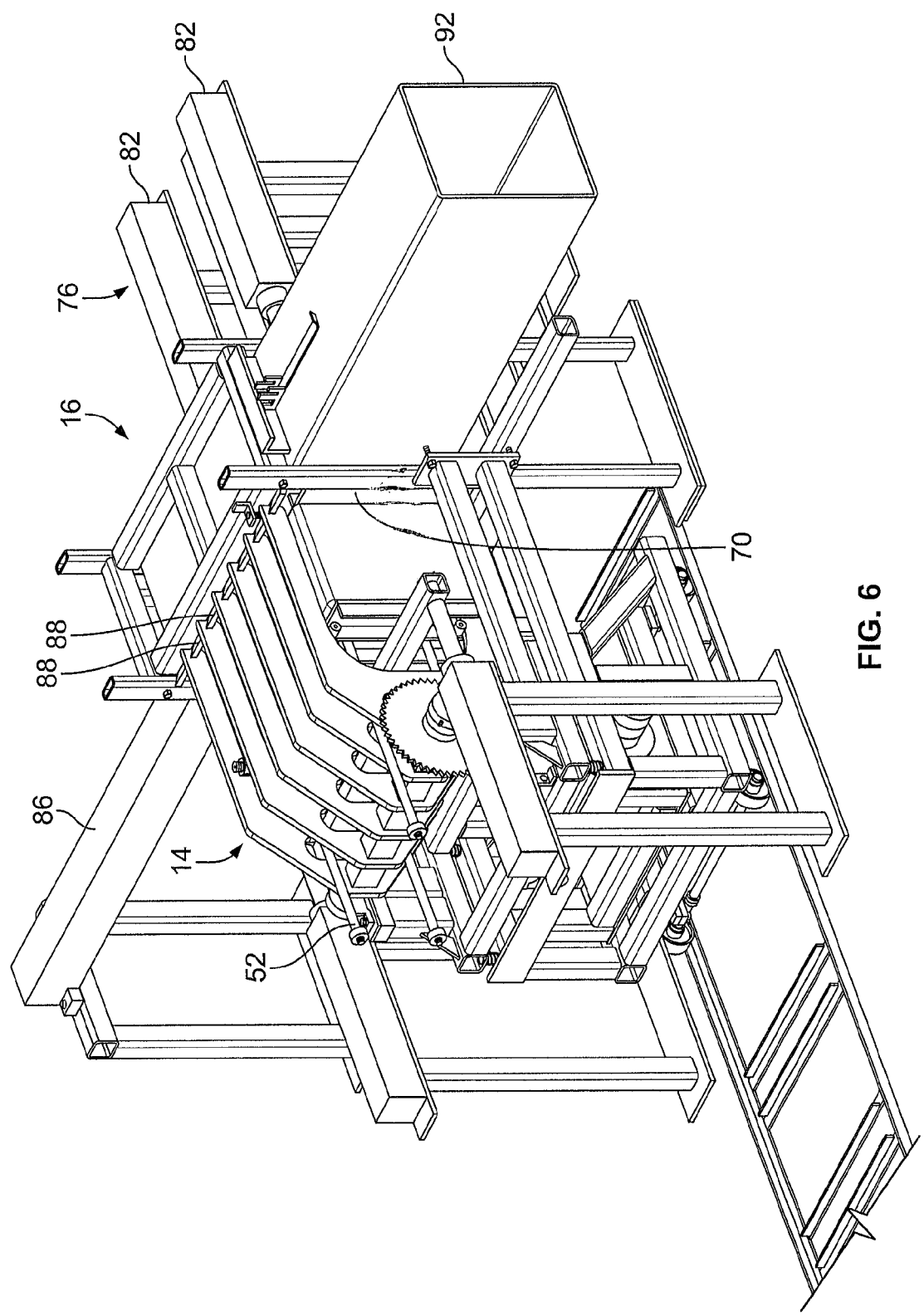
FIG. 6 is perspective view of the conveyor load carriage and mobile base in position to transfer a bale to a bagger.
Figure 8:
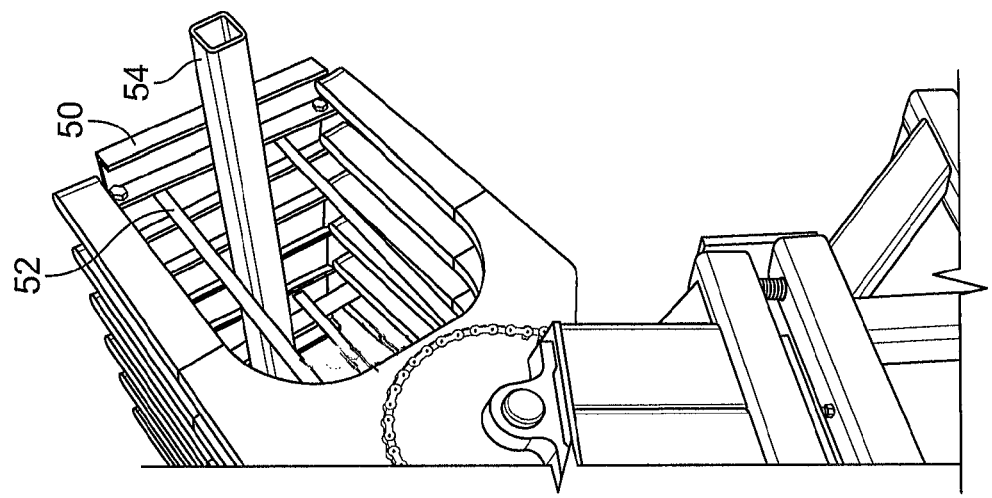
FIG. 8 illustrates the load carriage in a partially pivoted state with the transfer plate extended.
Figure 7:
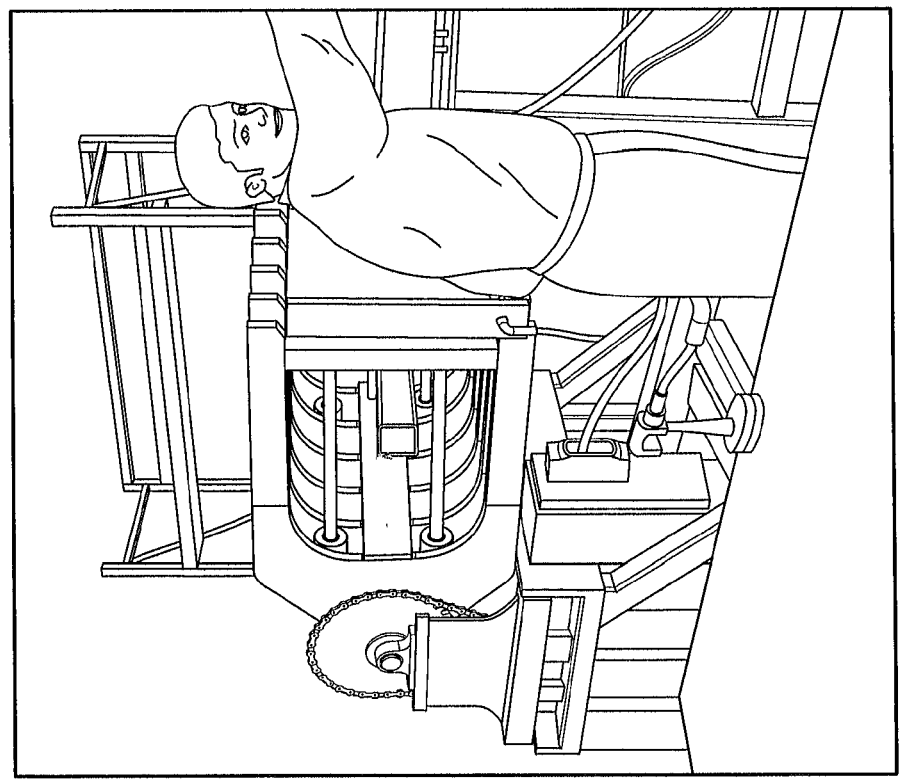
FIG. 7 illustrates the load carriage and base showing the transfer plate in an extended state.
Figure 10:
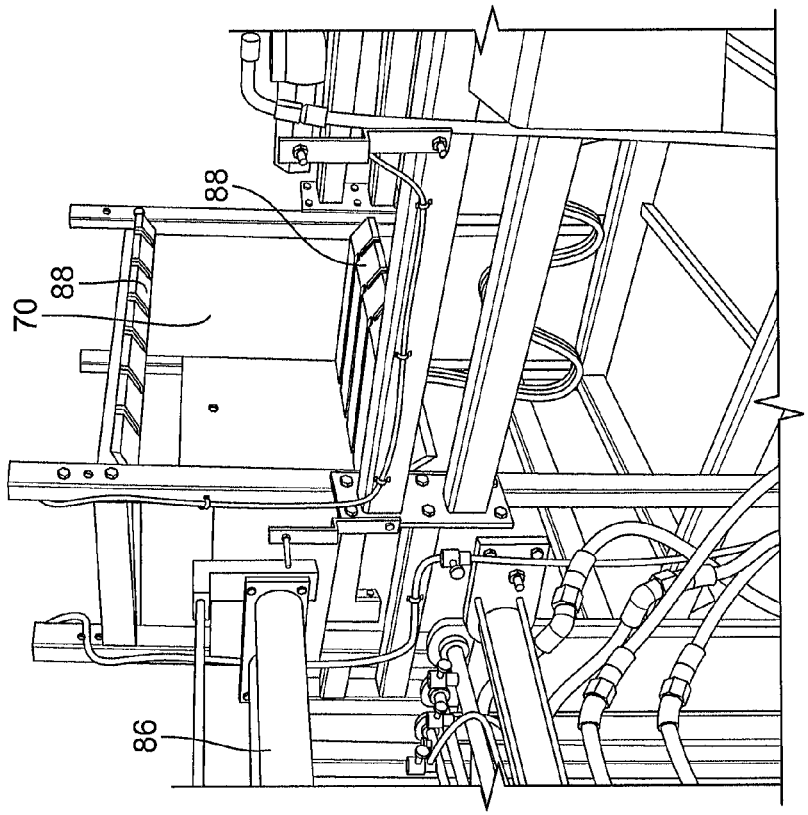
FIG. 10 is perspective illustration of the bagger entrance and showing, in partial view, the discharge drive.
Figure 9:
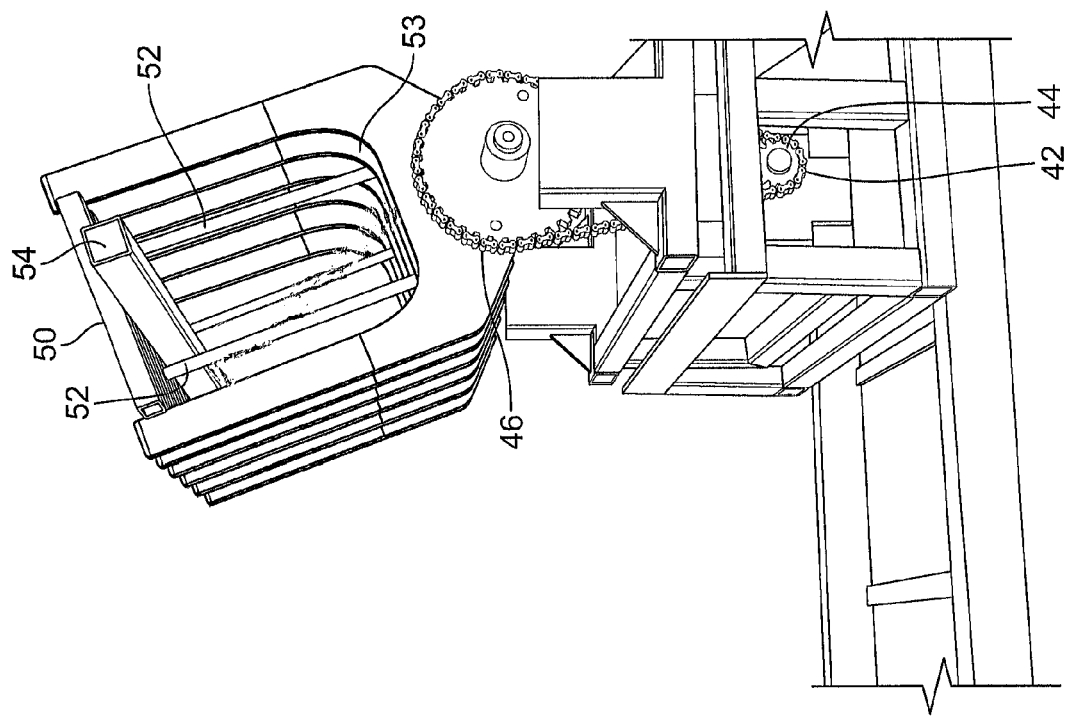
FIG. 9 is another illustration of the load carriage in a partially pivoted state.
Figure 12:
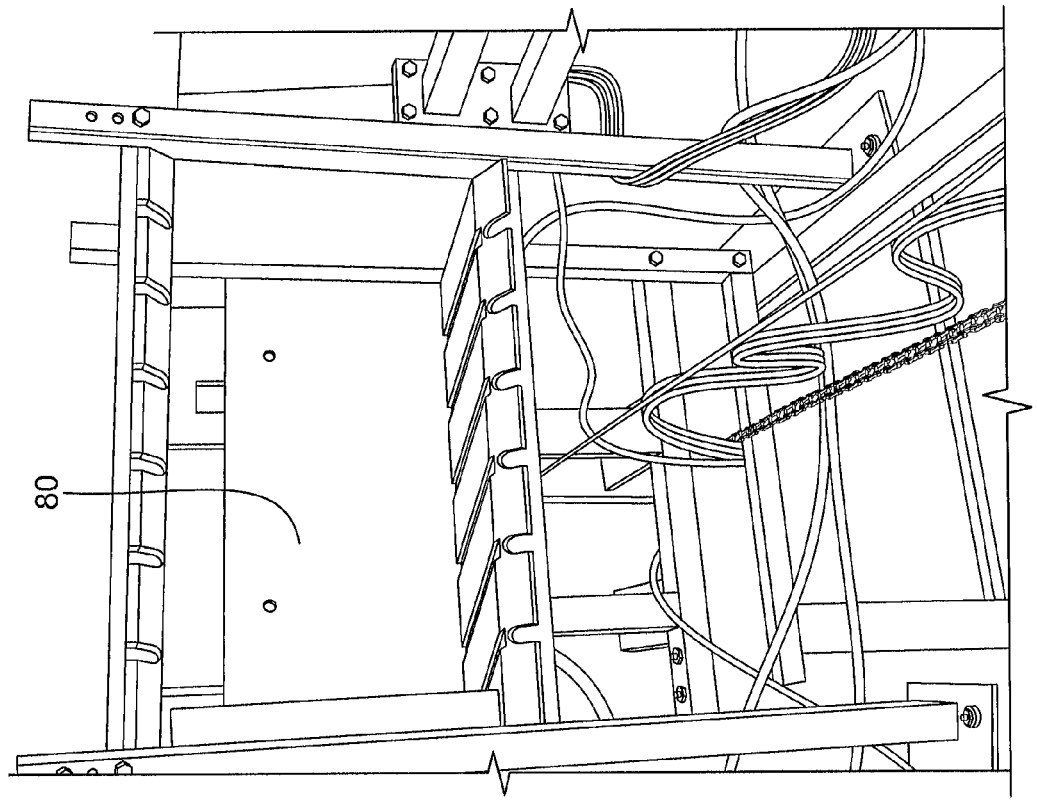
FIG. 12 is a view looking into the entrance of the bagger and showing the back-up plate.
Figure 11:
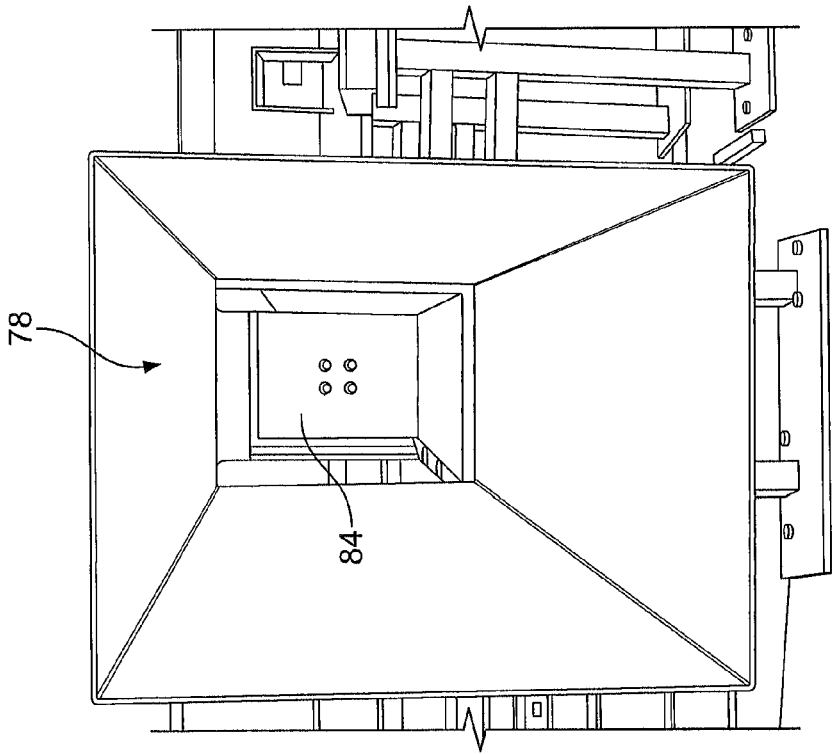
FIG. 11 is an illustration looking into the discharge end of the bagger and showing the discharge drive plate.
Figure 14:
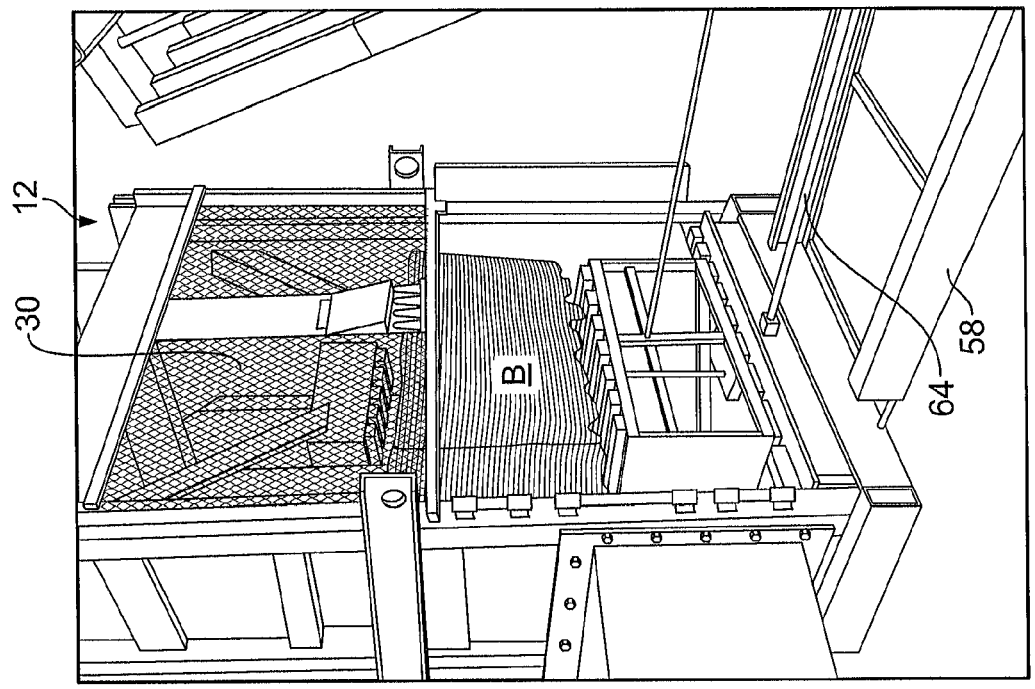
FIG. 14 is a perspective view of the bale press and a bale with the gate in an open position.
Figure 13:
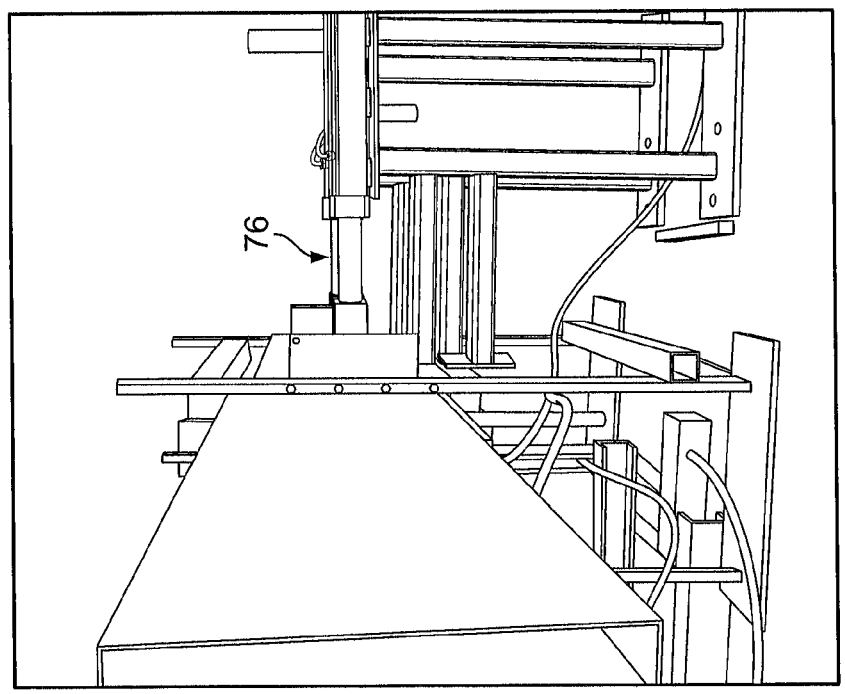
FIG. 13 is a side view of the bagger and the back-up cylinders.

Referring now to the figures, an example of an embodiment of the system of the present disclosure is shown. In particular, as shown in FIG. 1, the example system includes a baling machine (or baler) 10 configured to receive a bale of compressed material from a press 12. A press 12 includes a receiver 20 having a lower compression platen 22 on which a compressible material, such as cotton, is received. An upper plate or follower block 24 is positioned above the receiver 20. The follower block 24 and platen 22 include a series of guides or channels 26 therein. The guides 26 are configured to receive the tines 28 of fork sets 38 that insert above and below the bale B. The press 12 is of a known design. The press 12 includes gates 30 or other personnel protection features to prevent personnel access to the press 12 when in operation.

The baler 10 includes a conveyor or cart 14, a bagger 16 and a control system or controller 18. For purposes of the present disclosure, the relative directions of side-to-side will refer to, for example, movement of the conveyor and/or cart 14 between the press 12 and bagger 16, and the directions of front-to-rear or rear-to-front will refer to, for example, movement of a bale B through the bagger 16.

In the illustrated example, the conveyor 14 is formed as a cart 32 having a load carriage 34 and a mobile base 36. The load carriage 34 includes multiple fork sets 38 mounted parallel to one another along a common shaft 40 that defines an axis $A_{40}$. The fork sets 38 pivot about 180 degrees about the axis $A_{40}$ as a single unit.

The fork sets 38 are spaced from one another a distance to cooperate with the guides 26 in the follower block 24 and platen 22. That is, the fork sets 38 insert into the guides 26 to, as will be described below, provide upper and lower supports as the bale B is removed from the press 12.

A drive assembly 42 is operably connected to the fork sets 38 to rotate the fork sets 38 about the axis $A_{40}$. The drive assembly 42 includes a drive 44, such as a motor, which can drive the fork sets 38 through a chain drive 44 mounted to the shaft 40, as illustrated, a gear drive or the like. The fork sets 38 are mounted to rotate or pivot about the $A_{40}$ axis about 180 degrees to reorient the bale B.

A pusher or transfer plate 50 is mounted to the fork sets 38 and is configured to push a bale B that is positioned in the fork sets 38 out of the fork sets 38. Shafts 52, mounted to plate 50, are mounted for sliding engagement with linear bearings 53, which are mounted to the fork sets 38 to provide smooth, linear movement of the plate 50 and to assure that the plate 50 remains transverse to the fork sets 38 as the bale B is transferred from the fork sets 38. A support bar 54 is also mounted to the plate 50.

The load carriage 34 is mounted to the cart 14 by a pivot shaft 55 and a plurality of springs 56 extend between the load carriage 34 and the cart 14. The pivot shaft 55 allows the load carriage 34 to pivot a short distance side-to-side relative to the cart 14 and the springs 56 maintain the load carriage 34 in a relatively fixed relationship to the cart 14, but allow the load carriage 34 to pivot slightly to adjust any shifting of the bale B within the press 12 and any shifting of the follower block 24 or platen 22 that may occur.

It will be appreciated that because of the extreme force (up to one million pounds) that is exerted on the bale B, the follower block 24 and/or platen 22 may shift slightly. The pivot shaft 55 allows the load carriage 34 to pivot a short distance side-to-side and the springs 56 maintain the load carriage 34 in a relatively fixed relationship to the cart 14, but allow the load carriage 34 to pivot slightly to adjust for shifting of the bale B within the press 12.

The cart 14 is mounted to a track 58 along which it is conveyed between the press 12 and the bagger 16, The track 58 can be as long or as short as necessary to accommodate the footprint in which the system (including the press 12, conveyor/cart system 14 and bagger 16) is located. There are minimum space requirements, insofar as removing or withdrawing the bale B from the press 12 and rotating the load carriage 34 and bale B for introduction to the bagger 16.

A transfer station 66 is formed as part of the conveyor. In a present embodiment, the transfer station 66 includes a drive, such as the illustrated pair of cylinders 68 mounted upstream of the bagger 16 which cooperate with the transfer plate 50 and support bar 54 to ensure proper transfer of the bale B from the load carriage 34 to the bagger 16.

The bagger 16 includes an entrance 70, a discharge station 72, a bag mandrel 74 and may include a back-up assembly 76. The discharge station 72 includes a chute 78 into which the bale B is transferred from the load carriage 34. As such, the entrance 70 opens into a chute 78—the entrance 70 is that side facing the cart load carriage 34—to receive the bale B. The back-up assembly 76, if used, is positioned on a side opposite the entrance 70 and includes a movable wall 80 mounted to the chute 78 by a drive 82, for example, the illustrated plurality of cylinders. The wall 80 moves from the side of the chute 78 to the bale B as the bale B enters the entrance 70, to facilitate transfer of the bale B into the chute 78.

A discharge plate 84 is mounted at a rear of the discharge station 72, rearward of the entrance 70. The discharge plate 84 is driven forwardly into the chute 78 by a drive 86, for example, a cylinder. In a home position, the discharge plate 84 is rearward of the entrance 70 no as to not interfere with movement of the bale B into the chute 78. The cylinder or drive 86 for the discharge plate is a dual-acting drive so that the plate 84 can be returned to the home position following discharge of the bale B. The entrance 70 includes guides 88 that cooperate with the fork sets 38 when transferring a bale B from the load carriage 34 to the bagger 16.

The bag mandrel 74 is positioned at the front of the discharge station 72. A bag, having a sealed end, is positioned over the end of the mandrel 74. In this manner, as the bale B is pushed out of the chute 78, it engages the bag and pulls the bag onto and over the bale B.

The controller 18 includes an operator interface station 94. The controller 18 controls the overall operation of the baler system 10. The controller 18 can also be integrated to include control of the press 12.

In a cycle, material is loaded into the press 12. When the compression or compaction cycle is complete, the gate 30 on the press 12 is opened.

The cart 14 is moved toward and into the press 12. The fork sets 38, which are in a horizontal orientation, are inserted into the press follower block 24 and platen 22 guides 26 above and below the bale B, respectively. As noted above, in the event that the bale B shifts or that the guides 26 are slightly askew, the pivot shaft 55 and spring 56 mounting of the load carriage 34 to the cart 14 allow the load carriage 34 to pivot slightly side-to-side to align with the guides 26. Moving the cart 14 inward toward, and into engagement with the bale B urges the transfer plate 50 into the apex of the fork sets 38.

Once the cart 14 is properly positioned with the bale B captured within fork sets 38, the fork sets rotational drive 44 can be actuated to rotate the fork sets 38 and the bale B upward at a slight angle to facilitate loosening the bale B from the press 12. Once the bale B is flee of the press 12, the cart 14 backs away from the press 12 and begins to move toward the bagger 16. At this time, the fork sets 38 and bale B are pointed generally in the direction of the press 12.

The fork sets 38 are then rotated (about 180 degrees). The fork sets 38 can be rotated as the cart 14 is stopped or as the cart 14 is moving toward the bagger 16. In the final orientation, the fork sets 38 and the bale B are reoriented to point toward the bagger 16 with the bale B at about the entrance 70 of the chute 78. In this position, the fork sets 38 are located between the transfer cylinders 68 and the entrance 70, and the support bar 54 is aligned (horizontally) with the transfer cylinders 68.

To accept the bale B, the back-up assembly 76, if used, is extended toward the entrance 70, and the discharge plate 84 is in a retracted or home position. The cart 14 is moved toward the bagger 16 so that the fork sets 38 align and cooperate with the entrance guides 88, and the cart is further moved forward to move the bale B into the entrance 70. When the bale is at the entrance 70, the back-up assembly wall 80 is in contact with the side of the bale B at the entrance. In this manner, the bale B is captured between the transfer plate 50 and the wall 80. The back-up assembly 76, which as noted above may be used, can be used if, for example, there is more fiber on one side of the bale B than on the other side of the bale B. Thus, when the bale B is captured between the transfer plate 50 and the back-up assembly 76, the back-up assembly 76 supports bale B transfer from the fork sets 38 and also prevents loosening of the bale (e.g., the bale B is retained in the compressed state).

The transfer cylinders 68 are then actuated which pushes the transfer plate 50, which in turn pushes the bale B in a transfer direction from the fork sets 38 into the entrance 70. It will be appreciated that the shafts 52 maintain the plate 50 flat against the side of the bale B, and do not allow the plate to skew, as the bale B is pushed into the entrance 70. Pushing the bale B into the entrance 70 also pushes the wall 80 back to a retracted position.

Once the bale B is in the chute 78, the discharge plate cylinder 86 is actuated to push the bale B from the entrance 70 along or through the chute 78 toward the bag mandrel 74 in a bagging or containerizing direction. The bagging direction is transverse to the transfer direction.

It is contemplated that a bale B will be present in the discharge end 90 of the chute 78 as a subsequent bale is introduced into the entrance 70. As the bale B in entrance 70 is urged toward the discharge end 90, the prior bale (in the discharge end 90) is forced out through the mandrel 74 and is captured in a bag 100 at the final discharge 92.

The bag 100 includes reinforced regions or zones, as indicated at 102. In the illustrated example, the reinforced regions or zones 102 are at locations that correspond to or align with the load carriage tines 28, which correspond to or align with the channels 26 in the upper plate 24, lower platen 22 and bagger entrance guides 88.

In various embodiments, the bag 100 of the present disclosure is made of a suitable high strength material or combination of materials, such as polypropylene, polyethylene, polyethylene terephthalate (PET) and like materials. For example, the may be made of any suitable polymeric material, such as polypropylene, polyethylene, polyethylene terephthalate (PET), or other suitable material, or any combination of these. Other suitable materials will be recognized by those skilled in the art.

In an embodiment, a bag 100 may be formed as a sleeve from woven strands or tapes of a polymeric material, such as polyethylene terephthalate (PET). In an embodiment, the reinforced regions or zones 102 of the bag may be formed by weaving or looming the tapes 104 at a higher density in those locations than other locations where the tapes are woven or loomed at a lower density (i.e., woven more loosely). This results in reinforced regions or zones at the locations where the tapes are woven or loomed at the higher density.

Figure 18:
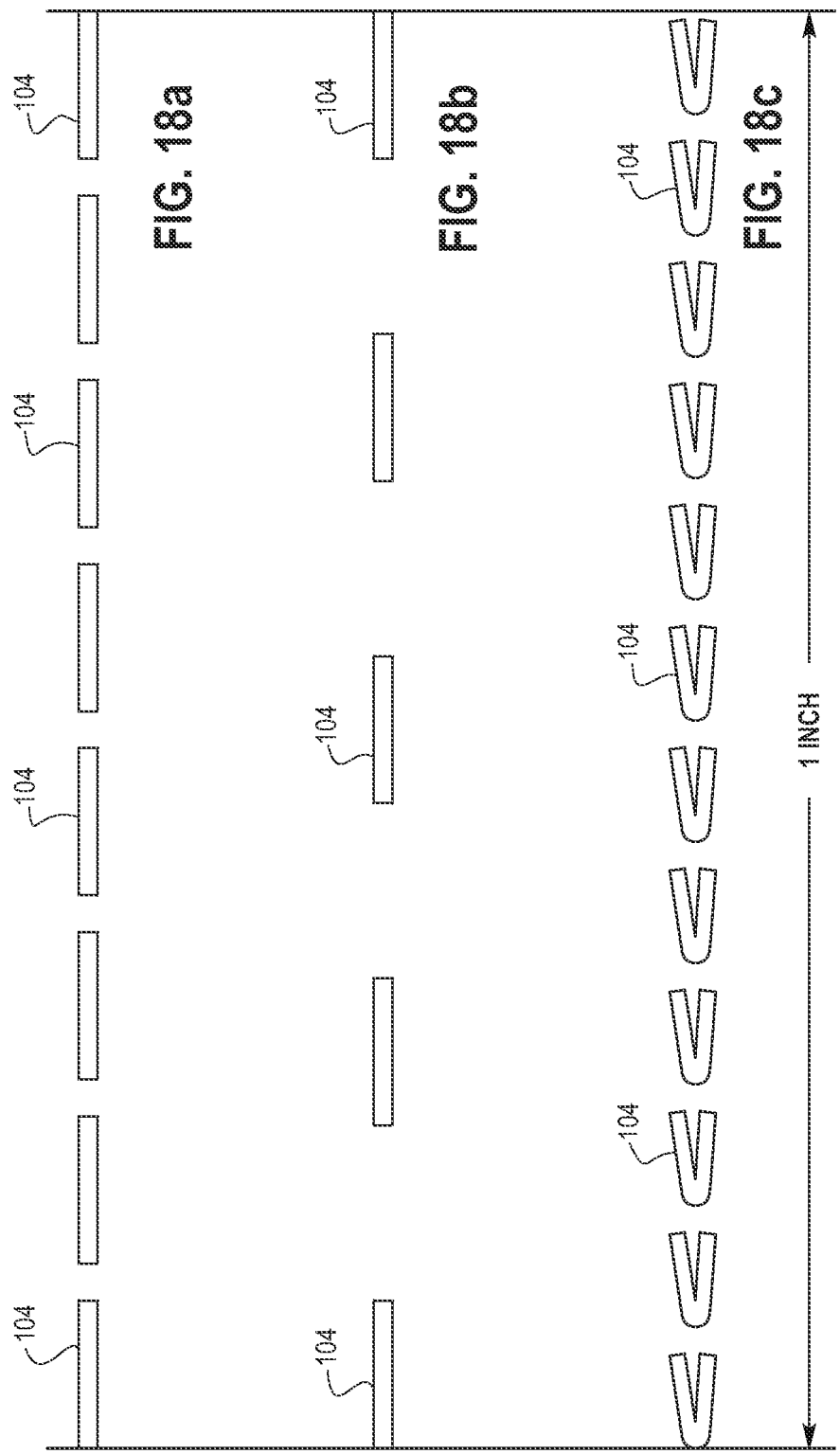
FIGS. 18a-18c illustrate three different example bag weave densities.

For example, as shown in FIGS. 18a to 18c, a standard weave for the bag material can be about 12 tapes 104 per inch (FIG. 18a), a loose weave for the bag material can be about five tapes 104 per inch (FIG. 18b), and a dense weave for the bag material can be about 18 tapes 104 per inch (FIG. 18c).

As discussed above, in some embodiments, the reinforced zones of the bag 100 are formed by increasing the density of the weave of the bag at certain locations. For example, if a standard weave of the bag is 12 tapes per inch, at certain locations or zones, the bag may be formed with a weave of about 18 tapes per inch. The areas or zones with the more densely woven tapes are the reinforced zones 102.

In other embodiments, the reinforced zones 102 are formed by weaving or looming the bag with tapes 104 that are folded over to half the width $w_{104}$ at the locations where reinforcement is desired. It should be appreciated that any suitable method may be employed to create a more densely woven area or zone on the bag (or material used to make the bag).

It should also be appreciated that the reinforced regions 102 may be any suitable width and maybe spaced apart in any suitable manner or at any suitable distance. For example, the reinforced regions may have a width of about 2 inches and maybe spaced from one another, on center, a distance of about 6.5 inches. In an embodiment, the reinforced regions may be registered from an end of the bag.

For example, the bag 100 may be fabricated with the reinforced regions 102 equally spaced from one another a distance $d_{102}$ and registered from an end 108 of the bag 100 a distance $r_{102}$. An end of the bag may include a seal 103. In an embodiment, as seen in FIG. 16 the bag 100 has an overall length $l_{100}$ of 87 inches, a usable length $l_{106}$ of 86 inches (one inch is reserved, for an end seal 108), is 24.5 inches in height $h_{100}$ and depth, with the reinforced regions 102 having a width $w_{102}$ of 2 inches, spaced from one another a distance $d_{102}$ 6.5 inches center to center, and registered $r_{102}$ to the sealed end 108 of the bag 100, e.g., beginning at 2.25 inches from the sealed end 108 of the bag 100.

In the illustrated embodiment, the reinforced regions or zones 102 are at designated locations, at least some of which correspond to the load carriage tines 28, which correspond to the recesses in the bale. More particularly, in such an embodiment, the reinforced regions or zones 102 are at locations that correspond to where the load carriage tines 28 engage the bale B. In other embodiments, the reinforced regions or zones may be located at designated locations which correspond to other areas of the bale that may be recessed so that the reinforced regions 102 are recessed from the face of the bag 100 (see, for example, FIG. 19). When the bale B is introduced into the bag 100 those areas that are expected to expand to a greater extent are between (as indicated at 103 in FIG. 15) the reinforced regions 102, which causes the reinforced regions or zones 102 to be recessed below the face F of the bag 100 after the cotton has expanded into the bag 100. In this manner, any face or side of the bagged bale B that is facing or resting on the ground (or floor) has portions that do not make contact with the ground. Therefore, even if the parts of the bag 100 that contact the ground are damaged (such as when the bale B is moved around the floor of a warehouse, or loaded and unloaded from a truck and the face of the bag 100 is abraded), the recessed portions, which correspond to the reinforced regions 102 of the bag 100 may remain intact. The reinforced portions 102 of the bag 100 effectively act as strapping, but are integrally formed or provided within the bag rather than being a separately applied element, as is known in the art.

The bag 100 may also be fabricated in a non-registered configuration, in which the reinforced regions begin at some location from the sealed end of the bag, but retain the 2 inch width and 6.5 inch center to center spacing. In various embodiments, the bag of the present disclosure can include ventilation holes or openings 110 to permit ventilation for the compressed load to, for example, reduce condensation in the wrapped load and to permit air circulation around the load.

In either configuration, as seen in FIGS. 19 and 20, the reinforced regions 102 correspond to or align with the fork set tines 28, which will correspond to the channels 26 in the upper plate 24 and lower platen 22 of the press 12.

As noted above, the baling system and method enables compressing and containing, and protecting, a compressible material such as cotton, without the need for straps, wires or the like. In an embodiment, the method includes compressing a quantity of a compressible material, such as cotton, into a bale, and introducing the compressed material into package, such as a bag.

In an embodiment, a method for containing a bale of compressible material without straps or wires includes receiving a quantity of compressed material, compressing the material into a bale and introducing the bale of compressed material, without straps or wires, into a container, such as a bag 100, in the compressed state. In an embodiment, the compressed bale is positioned within a bag 100 having reinforced regions 102. In various embodiments, the bag 100 can be closed or sealed to form a packaged bale for subsequent handling.

In an embodiment, the method includes compressing the bale of material at a location (a compressing location) and transferring the compressed bale, in a transfer direction to a different location (a bagging or containerizing) location for bagging. In some embodiments, while being transferred to the bagging location, the bale is retained in the compressed state. Bagging or containerizing may be carried out in a different direction (a bagging or containerizing direction) different from (e.g., transverse to) the transfer direction.

In an embodiment, the method can include receiving the bale of compressed material in a conveyor having a mobile portion and a load carriage. The load carriage is movably mounted to the mobile portion and includes a region for receiving the bale of compressed material. The load carriage includes multiple tines configured for supporting the bale of compressed material, the tines engaging the bale at at least some of the recessed regions.

The method can include transferring the bale into a bagger including a chute having an entrance and a discharge. The discharge has a bagging mandrel. The bagger is configured to receive the bale and move the bale from the entrance to the discharge and the bagging mandrel. The method can further include introducing the bale into the bag. A bag can have reinforced regions formed therein, at least some of the reinforced regions corresponding to the recessed regions of the bale, and can include ventilation openings. The bale is introduced into the bag without straps or wires.

In an embodiment, the bale can be registered from an end of the bag. The bale can be formed having recessed regions. The bale can be reoriented as part of the step of transferring the bale into the bagger.

In various embodiments, the bag can be formed from multiple tapes of a polymeric material. The reinforced regions can be formed by a higher density of tapes than non-reinforced regions.

It should be appreciated that the present baling system and method enables high pressure compaction of compressible material, conveyance and packaging (e.g., bagging) without the need for applying strapping or wire (or other similar structures) to or on the bale.

Although the various drives are described as motors, chain drives, cylinders and the like, it is to be understood that any type of suitable drive other than those described can be used in most if not all of the disclosed assemblies and that all such drives fall within the scope of the present disclosure.

It will also be appreciated by those skilled in the art that the relative directional terms such as sides, upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A method for containing a bale of compressed material, the bale of compressed material having recessed regions therein, the method comprising:
    receiving the bale of compressed material in a conveyor having a mobile portion and a load carriage, the load carriage movably mounted to the mobile portion and including a region for receiving the bale of compressed material, the load carriage including multiple tines configured to engage the bale of compressed material at one or more of the recessed regions of the bale;
    transferring the bale to a bagger, the bagger including a chute having an entrance and a discharge, the discharge associated with a bagging mandrel, the bagger configured to receive the bale from the conveyor and move the bale from the entrance to the discharge and the bagging mandrel; and
    introducing the bale into a bag having reinforced regions, wherein at least some of the reinforced regions of the bag correspond to the recessed regions of the bale.

2. The method of claim 1 wherein the bag is formed from multiple tapes of a polymeric material.

3. The method of claim 2 wherein the reinforced regions are formed by a higher density of tapes than non-reinforced regions.

4. The method of claim 2 wherein the bag is formed from multiple woven tapes of the polymeric material.

5. The method of claim 1 wherein at least some of the reinforced regions are equally spaced from adjacent ones of the reinforced regions.

6. The method of claim 2 wherein the reinforced regions have a tape density of about 18 tapes per inch and the non-reinforced regions have a tape density of about 5 to about 12 tapes per inch.

7. The method of claim 1 wherein the reinforced regions have a width of about 2 inches and are spaced from one another, on center, a distance of about 6.5 inches.

8. The method of claim 1 wherein the reinforced regions are registered from an end of the bag.

* * * * *

UNITED STATES PATENT AND TRADEMARK OFFICE
CERTIFICATE OF CORRECTION

| | |
|---|---|
| PATENT NO. | : 9,655,303 B2 |
| APPLICATION NO. | : 14/445973 |
| DATED | : May 23, 2017 |
| INVENTOR(S) | : Timothy B. Pearson et al. |

It is certified that error appears in the above-identified patent and that said Letters Patent is hereby corrected as shown below:

On the Title Page

Item (57), Abstract, Column 2, Line 4, "bag the" to read as --bag, the--.

In the Specification

Column 5, Line 63, "70 no as" to read as --70 so as--.

Column 6, Line 30, "flee" to read as --free--.

Column 8, Line 3, "reserved, for" to read as --reserved for--.

Column 8, Line 39, "hag" to read as --bag--.

Column 8, Lines 59-60, "into package" to read as --into a package--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*